No. 727,084. Patented May 5, 1903.

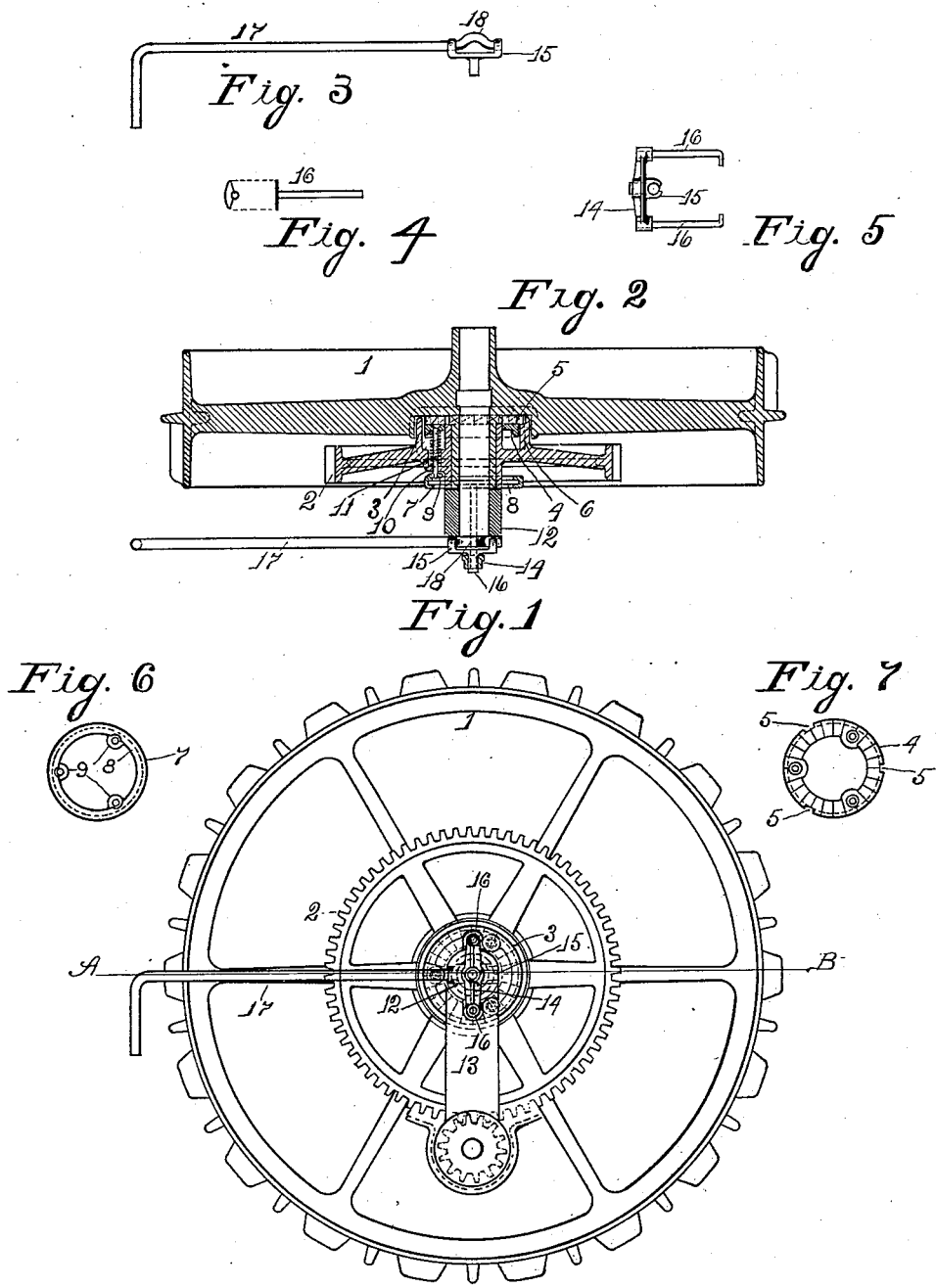

UNITED STATES PATENT OFFICE.

EDWARD W. BURGESS, OF MILWAUKEE, WISCONSIN, ASSIGNOR TO INTERNATIONAL HARVESTER COMPANY, OF CHICAGO, ILLINOIS, A CORPORATION OF NEW JERSEY.

GEAR-SHIPPING MECHANISM.

SPECIFICATION forming part of Letters Patent No. 727,084, dated May 5, 1903.

Application filed June 9, 1902. Serial No. 110,771. (No model.)

*To all whom it may concern:*

Be it known that I, EDWARD W. BURGESS, a citizen of the United States, residing at Milwaukee, in the county of Milwaukee and State of Wisconsin, have invented certain new and useful Improvements in Gear-Shipping Mechanism, of which the following is a specification, reference being had to the accompanying drawings, forming a part thereof.

My invention relates to improvements in gear-shipping mechanism, whereby a driven member of the mechanism is caused to engage with driver or be disengaged therefrom; and the objects of my improvement are, first, to provide a positive engagement of the parts with no possibility of their accidentally becoming disengaged; second, to avoid all friction of parts when disengaged, and, third, to provide a mechanism that may be clutched or unclutched whether the parts be idle or in motion. I attain these objects by the mechanism illustrated in the accompanying drawings, in which—

Figure 1 is a plan view of a part of my invention. Fig. 2 is a section on line A B, Fig. 1. Fig. 3 is a plan view of the shipping-lever and swivel-piece. Fig. 4 is a detail view of one of the shipper-hooks. Fig. 5 is a detail view of the cross-head and swivel and the shipper-hooks. Fig. 6 is a detail view of the shipper-ring, and Fig. 7 is a detail view of the clutch-ring.

Similar numerals refer to similar parts throughout the several views.

1 is the main drive-wheel of a harvester. 2 is the main gear-wheel, that is journaled on the hub of wheel 1 and clutches therewith. An annular channel surrounds the hub of the wheel 1 at its inner end, and radial ratchet-teeth are formed on the vertical flange of the channel, as shown by dotted lines in Figs. 1 and 2. Surrounding the hub of the gear-wheel 2 is an annular ring 3, adapted to enter the channel in wheel 1. A clutch-ring 4 slides into the ring 3. On the inner face of the clutch-ring 4 are radial ratchet-teeth adapted to engage with the teeth on wheel 1. On the periphery of the clutch-ring 4 are longitudinal slots 5, that engage with internal longitudinal ribs 6 on the annular ring 3.

7 is a shipping-ring surrounding the outer end of the hub-wheel 2. The ring 7 is provided with an annular internal groove 8 and inwardly-projecting radial ears 9. The shipping-ring 7 is connected with the clutch-ring 4 by the rods 10, secured in the ears 9. The rods 10 pass through holes in the hub of the gear-wheel 2. These holes are made large enough at their inner ends to receive helical springs 11, that surround the connecting-rods 10. The springs acting between the clutch-ring 4 and the outer wall of the enlarged portions of the holes in the hub of wheel 2 yieldingly hold the clutch-ring 4 in engagement with the clutch-teeth on the hub of wheel 1.

12 is a hub on the carrying-arm 13, and the axle of the main wheel is secured therein.

14 is a cross-head extending across the outer end of the hub 12, and 15 is a swivel piece pivoted in said cross-head.

16 represents hooked rods secured in the ends of the cross-head and passing through holes in the hub 12 and have their hooked ends engaging with the annular groove 8 in the shipping-ring 7. The hooks on these rods are formed, as shown in Fig. 4, broad enough to secure them from turning out of the groove 8 should they be loose in the cross-head 14.

17 is the operating-rod, formed with a crank at its outer end and at its inner end given a double bend, forming a central crank 18 to act against the end of the hub 12. The rod 17 is placed between the two forks on the ends of the swivel-piece 15, and the ends are bent partially around the rod to secure it therein, leaving the crank portion 18 central with the pivot of the swivel-piece 15, as shown in Fig. 3. A support for the outer end of the rod 17 may be attached at any convenient point on the frame of the machine.

The operation of the device is as follows: The clutch-ring 4 being held in engagement with the ratchet-teeth on the hub of the main wheel 1 by the force of the springs 11 and also engaging with the wheel 2 by means of the longitudinal grooves 5 engaging with the teeth 6 of said wheel 2, the two wheels are connected in a manner that will positively produce simultaneous movement of the two when moving in one direction, and the clutch-ring 4 will move away from the engagement with the teeth in the main-wheel hub when the said wheel is moving in the other direction. The movable clutch-ring 4 being held by the clutch-wheel 2, they will both be stationary when the ring is disengaged from the teeth in the main wheel, and there will be no friction or wear of any of the various parts of the mechanism.

What I claim as my invention, and desire to secure by Letters Patent, is—

1. In a clutch, the combination of a driving member having radial ratchet-teeth concentric with the axis thereof, a driven member, a clutch-ring engaging rotatively with the driven member, and movable longitudinally in relation to its hub, said clutch-ring having radial ratchet-teeth adapted to engage with the teeth of the driving member, springs seated in cavities in the hub of the driven member, and acting to hold the clutch-ring in engagement with the driving member, a shipping-ring movable longitudinally on the outer end of the hub of the driven member, connections between said ring and the clutch-ring that move rotatively therewith, and non-rotative mechanism connected with the said shipping-ring for the purpose of moving it longitudinally against the action of the springs.

2. In a clutch mechanism the combination of a driving member having radial ratchet-teeth concentric with the axis thereof, a driven member, a clutch-ring engaging rotatively with the driven member, and movable longitudinally, in relation to its hub, said clutch-ring having radial ratchet-teeth adapted to engage with the teeth of the driving member, springs seated in cavities in the hub of the driven member, and acting to hold the clutch-ring in engagement with the driving member, a shipping-ring movable longitudinally on the outer end of the hub of the driven member, and provided with an annular groove, an axle-supporting arm, connecting-rods with hooked ends seated in said annular groove, and guideways for the rods in the hub of the supporting-arm, a cross-head connecting the outer ends of said rods, an operating crank-rod journaled in a saddle-piece pivoted on the cross-head, said crank-rod operating between the cross-head and the end of the hub, of the axle-supporting arm, substantially as described.

3. In a clutch mechanism for harvesters, the combination of a driving-wheel having a drum-like central portion, surrounding the axle-sleeve with radial ratchet-teeth on the bottom of the drum, an axle, an axle-supporting arm having a hub in which said axle is secured, a driven wheel journaled on the sleeve of the drive-wheel and provided with a drum-like central portion, coinciding with the drum portion of the driving-wheel, longitudinal ribs on the internal surface of the rim of the drum of the driven wheel, a clutch-ring having radial ratchet-teeth, and longitudinal grooves, in its periphery that coincide with the said internal ribs, said clutch-ring adapted to slide longitudinally within the said drum portion and be rotatively connected therewith, a shipping-ring located outside the bottom of the drum, connecting-rods passing through holes in the bottom of the drum, and connecting the clutch-ring with the shipping-ring, helical springs surrounding said connecting-rods and acting between the bottom of the drum and the clutch-ring, a cross-head positioned across the outer end of the hub of the axle-supporting arm, connecting-rods between the cross-head and shipping-ring, guideways for the rods through the hub of the supporting-arm, and a lever for moving the cross-head, away from said hub.

4. In a clutch mechanism for harvesters, the combination of a main drive-wheel and axle, an axle-supporting arm, a wheel whose axis is coincident with that of the main drive-wheel, clutch mechanism operating between the two wheels, a cross-head positioned across the end of the hub of the axle-supporting arm, connections between the cross-head and the movable member of the clutch, a saddle-piece pivoted on the cross-head, a crank-lever, journaled on the saddle-piece and operating to throw the cross-head away from the hub on the supporting-arm.

5. In a clutch mechanism for harvesters, the combination of the main wheel having a gear or sprocket wheel journaled on the same axis, clutch members operating between the two wheels, and axle-supporting arm, a yoke adapted to slide in guideways formed in the supporting-arm, a swivel bearing-piece having pivoted connection with the cross-head of the yoke, and a crank journaled in the bearing-piece and acting against the supporting-arm to move the yoke longitudinally relative to the axle, and connections between one member of the clutch and the yoke.

6. In a clutch mechanism for harvesters, the combination of a main drive-wheel and a gear-wheel journaled thereon, two primary clutch members consisting of annular rings having radial ratchet-teeth upon their meeting faces adapted to interlock, one member being secured to the main wheel, the other member adapted to move longitudinally on the hub of the gear-wheel, but held from independent rotative movement, springs operating to hold the two members in engagement, a main-wheel axle and an axle-supporting arm, a yoke adapted to slide in guideways formed in the said supporting-arm, connections between the yoke and the sliding member of the clutch and means for sliding the yoke to disengage the clutch members.

7. In a clutch mechanism for harvesters, a combination of the main drive-wheel having a flanged hub, radial ratchet-teeth on the flange, a gear-wheel whose axis is coincident with the axis of the main wheel, said gear-wheel having a cylindrical portion surrounding its hub, the cylinder having internal ribs parallel with the axis thereof, a clutch-ring having radial ratchet-teeth and longitudinal grooves across the periphery thereof, adapted to slide on said ribs, said ratchet-teeth adapted to engage with the teeth on the main wheel, coiled springs that operate between the end of the cylinder and the clutch-ring to hold it in engagement with the main wheel, a ring surrounding the hub beyond the closed end of the cylinder, connections between said ring and the clutch-ring, and means connected with said ring to hold the clutch-ring disengaged from the main wheel.

In witness whereof I hereto affix my signature in presence of two witnesses.

EDWARD W. BURGESS.

Witnesses:
FRANK J. DRYBURGH,
EARLE J. BRYDEN.